US006929074B1

(12) United States Patent
Lai

(10) Patent No.: US 6,929,074 B1

(45) Date of Patent: Aug. 16, 2005

(54) ELBOW-TYPE POWER HAND TOOL

(75) Inventor: Ying-Hui Lai, Taichung (TW)

(73) Assignee: Mobiletron Electronics Co., Ltd., Taichung Hsien (TW)

( * ) Notice: Subject to any disclaimer, the term of this patent is extended or adjusted under 35 U.S.C. 154(b) by 0 days.

(21) Appl. No.: 10/862,420

(22) Filed: Jun. 8, 2004

(51) Int. Cl.[7] .................................................. B23Q 5/00

(52) U.S. Cl. ........................ 173/178; 173/216; 173/217

(58) Field of Search ................................ 173/216, 217, 173/170, 213, 176, 178

(56) References Cited

U.S. PATENT DOCUMENTS

| | | | | |
|---|---|---|---|---|
| 6,446,734 | B1 * | 9/2002 | Williams et al. | 173/1 |
| 6,460,629 | B2 * | 10/2002 | Bookshar et al. | 173/176 |
| 6,523,442 | B2 * | 2/2003 | Lehnert et al. | 81/467 |
| 6,745,883 | B2 * | 6/2004 | Eto et al. | 192/56.62 |
| 6,805,207 | B2 * | 10/2004 | Hagan et al. | 173/170 |
| 6,843,327 | B2 * | 1/2005 | Meixner et al. | 173/11 |
| 6,857,983 | B2 * | 2/2005 | Milbourne et al. | 475/269 |
| 2002/0096343 | A1 * | 7/2002 | Potter et al. | 173/216 |

* cited by examiner

*Primary Examiner*—Rinaldi I. Rada
*Assistant Examiner*—Brian Nash
(74) *Attorney, Agent, or Firm*—Bacon & Thomas PLLC

(57) ABSTRACT

An elbow-type power hand tool including a housing, a motor, a planet gear set, a transmission shaft, and a torque controller mounted in the housing for controlling output torque of the transmission shaft. The power hand tool including a battery pack mounted in the housing that provides electricity to a power drive, an output shaft coupled to the transmission shaft that extends perpendicular to the transmission shaft, and a chuck assembly coupled to an end of the output shaft remote from the transmission shaft for holding a tool bit.

5 Claims, 3 Drawing Sheets

ELBOW-TYPE POWER HAND TOOL

BACKGROUND OF THE INVENTION

1. Field of the Invention

The present invention relates to a power hand tool and more particularly, to an elbow-type power hand tool, such as cordless power screwdriver, power driller, etc.

2. Description of the Related Art

A conventional linear-type power hand tool, such as cordless power screwdriver, generally comprises a housing, an output shaft axially rotatably extended out of a front end of the housing for coupling a tool bit, a power drive, e.g. a DC motor, mounted inside the housing for rotating the output shaft, and a torque control mechanism, which comprises one or more planet gear trains and is connected between the motor shaft and the output shaft for regulating the output torque of the output shaft. The torque control mechanism further comprises a threaded adjustment ring axially moveably coupled to the housing, a plurality of steel balls rested on an outer surface of the ring gear of the planet gear train, and a coil spring squeezed between the adjustment ring and the steel balls. The ring gear is rotatably mounted in the housing; however, the ring gear is kept stationary in normal status because the steel balls forced by the spring tightly press on the outer surface of the ring gear to hold the ring gear unrotatable. If a user adjusts the position of the adjustment ring on the housing by rotating the adjustment ring, the spring power of the spring that pushes the steel balls will be adjusted, so that the maximum output torque of the power hand tool will be relatively adjusted. When the output shaft receives a resistance that exceeds the maximum output torque, the rotation of the output shaft is stopped. In the meantime, the power, which is continuously generated by the DC motor and transmitted by the motor shaft that serves as the sun gear of the planet gear train, will be transmitted to the ring gear through the planet gears to further rotate the ring gear such that no power is further outputted from the output shaft.

The housing of the power hand tool that is equipped with the aforesaid torque control mechanism needs to provide sufficient space for installation and movement of the adjustment ring. However, a conventional elbow-type power hand tool provides no sufficient space for the aforesaid torque control mechanism. Therefore, the conventional elbow-type power hand tool does not provide a torque adjustment function.

SUMMARY OF THE INVENTION

It is the primary objective of the present invention to provide an elbow-type power hand tool, which provides a torque adjustment function.

To achieve this objective of the present invention, the elbow-type power hand tool comprises a housing, a power drive mounted inside the housing and having a motor, a planet gear set, and a transmission shaft, a torque controller mounted in the housing for controlling output torque of the transmission shaft, a battery pack mounted in the housing for providing electricity to the power drive, an output shaft coupled to an end of the transmission shaft, and a chuck assembly coupled to an end of the output shaft remote from the transmission shaft for holding a tool bit. The transmission shaft of the power drive defines an axial line. The output shaft defines an axial line, which defines with the axial line of the transmission shaft a contained angle smaller than 180°.

DETAILED DESCRIPTION OF THE INVENTION

Figure 1:
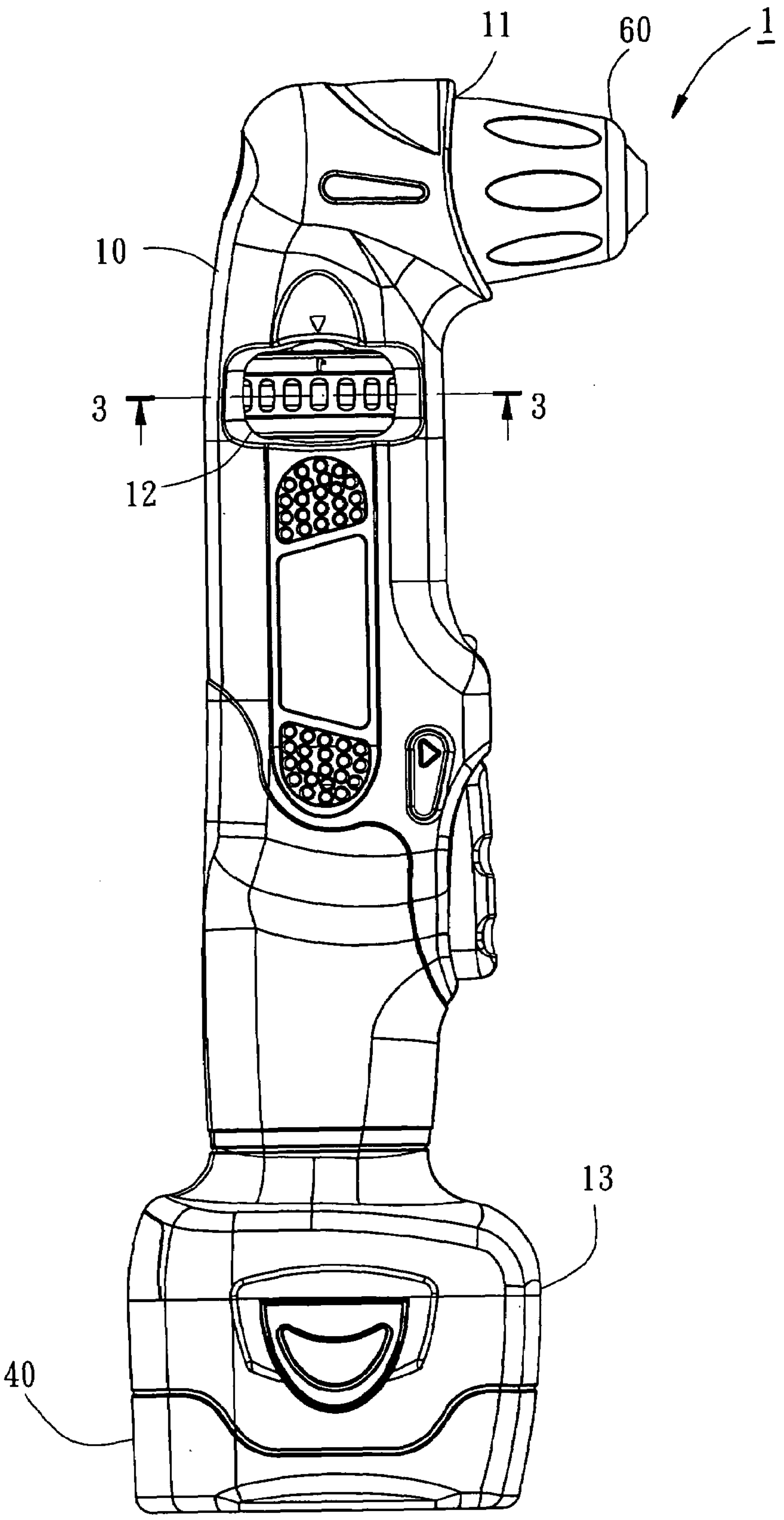
FIG. 1 is a front view of an elbow-type power hand tool according to the present invention.
Figure 2:
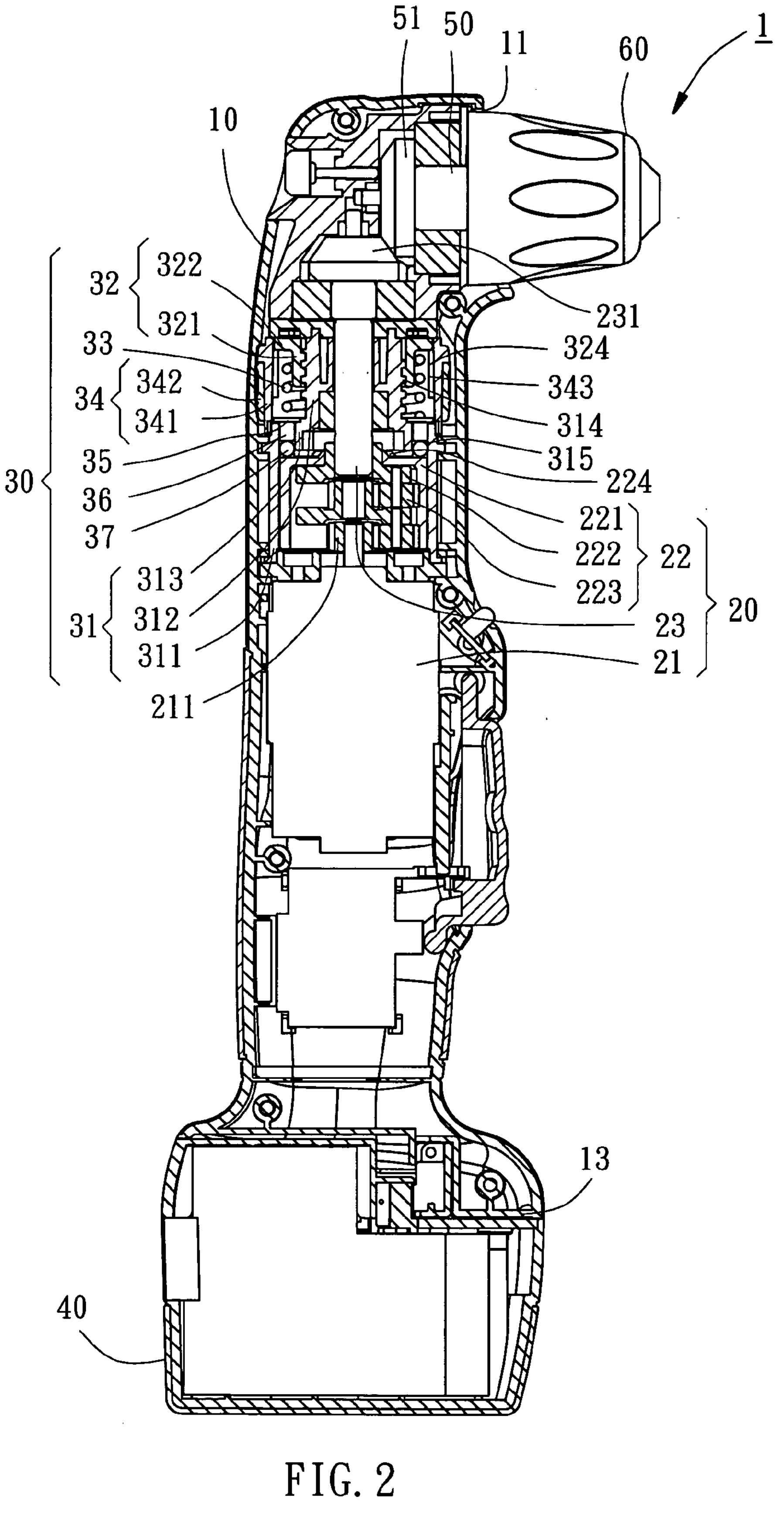
FIG. 2 is a sectional view of the elbow-type power hand tool according to the present invention.
Figure 3:
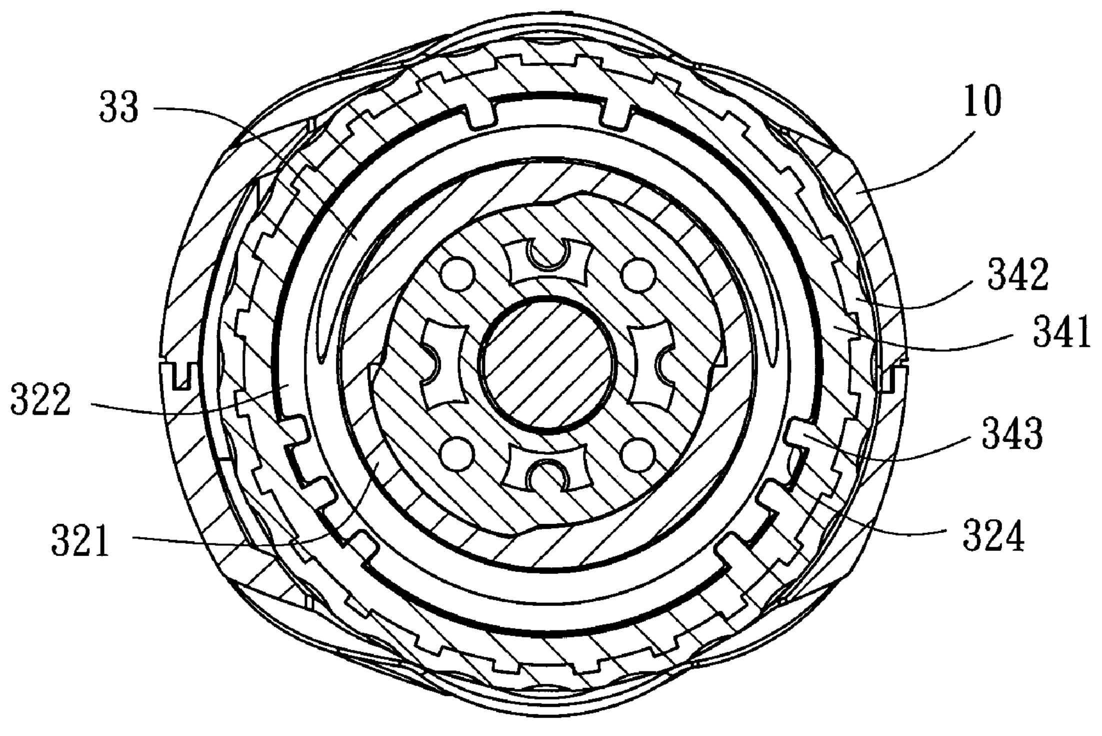
FIG. 3 is a sectional view in an enlarged scale taken along line 3—3 of FIG. 1.

Referring to FIGS. 1 and 2, an elbow-type power hand tool 1 is shown comprised of a housing 10, a power drive 20, a torque controller 30, a battery pack 40, an output shaft 50, and a chuck assembly 60.

The housing 10 is a hollow shell having a front opening 11 formed in the front end thereof, two oval side holes 12 bilaterally disposed on the middle near the top side, and an expanded bottom open coupling end 13, which couples the battery pack 40.

The power drive 20 is mounted in a middle part inside the housing 10, comprising a motor 21 disposed at a rear side, a transmission shaft 23 disposed at a front side, and a planet gear set 22 coupled between the motor 21 and the transmission shaft 23. The motor 21 has the output end thereof mounted with a sun gear 211, which is meshed with the planet gears 223 of the planet gear set 22. The transmission shaft 23 is coupled to the output end of the planet gear set 22. Starting the motor 21 causes the planet gear set 22 to rotate the transmission shaft 23. The transmission shaft 23 is mounted in a middle part inside the housing 10 and axially extended toward the front end of the housing 10, having the front end thereof mounted with a bevel gear 231. The planet gear set 22 further comprises a ring gear 221, two planet gear carriers 222, and a plurality of planet gears 223 mounted in the planet gear carriers 222 and meshed with the ring gear 221. Because this design of power drive 20 is commonly seen in regular power hand tools, no further detailed description in this regard is necessary.

The output shaft 50 is disposed in the front end of the housing 10, having a rear end mounted with a bevel gear 51, which is meshed the bevel gear 231 at the transmission shaft 23, and a front end suspending in the front opening 11 of the housing 10. The central axis of the output shaft 50 extends in direction perpendicular to the extending direction of the transmission shaft 23.

The chuck assembly 60 is mounted in the front opening 11 of the housing 10 and coupled to the output shaft 50.

The battery pack 40 is detachably coupled to the expanded bottom open coupling end 13 of the housing 10 for providing the necessary working voltage to the motor 21.

The torque controller 30 is mounted inside the housing 10 around the power drive 20, comprising a socket 31, a constraint member 32, a spring member 33, an outer ring 34, a washer 35, a plurality of pins 36, and a plurality of steel balls 37. The socket 31 comprises a first body portion 311, a second body portion 312, a connecting portion 313 connected between the first body portion 311 and the second body portion 312, an outer thread 314 extended around the periphery of the second body portion 312, and a plurality of through holes 315 radially extended through the connecting portion 313. The first body portion 311 accommodates the ring gear 221 of the planet gear set 22. The outer diameter of the second body portion 312 is smaller than the outer diameter of the first body portion 311. The transmission shaft 23 passes through the second body portion 312. The constraint member 32 comprises a coupling barrel 321, an inner thread 323 formed in the inside wall of the coupling barrel 321 and threaded onto the outer thread 314 of the second body portion 312, a constraint portion 322 extended from the top side of the coupling barrel 321, and a plurality of grooves 324 longitudinally arranged on the constraint portion 322. When rotating the constraint member 32 clockwise/counter-clockwise, the constraint member 32 is axially moved forwards/backwards along the second body portion 312 of the socket 31. The steel balls 37 are respectively mounted in the through holes 315 of the socket 31 and stopped at the top side of the ring gear 221. The pins 36 are respectively inserted into the through holes 315, each having a first end stopped against one steel ball 37 and a second end protruding over the respective through hole 315. The washer 35 is pressed on the second end of each pin 36. The spring member 33 is stopped between the washer 35 and the constraint portion 322 of the constraint member 32. Therefore, the spring power of the spring member 33 is applied to the washer 35 to force the pins 36 at the steel balls 37 against the top side of the ring gear 221. The outer ring 34 comprises a ring body 341, a ring covering 342 directly molded on the ring body 341, and a plurality of ribs 343 longitudinally arranged around the inner diameter of the ring body 341. The hardness of the ring covering 342 is lower than the ring body 341. The outer ring 34 is sleeved onto the constraint member 32, keeping the ribs 343 respectively engaged into the grooves 324 of the constraint member 32. Further, the outer ring 34 has a part exposed to the side holes 12 of the housing 10 for turning by the user's hand.

When in use, the user holds the middle part of the elbow-type power hand tool 1 with the hand and switches on an on/off switch 70 at the housing 10 to let electricity be transmitted from the battery pack 40 to the motor 21, causing the motor 21 to rotate the planet gear set 22 and then the transmission shaft 23 and the output shaft 50, and therefore the chuck assembly 60 is driven to rotate the tool bit (not shown) against the workpiece. At this stage, the ring gear 221 is held stationary. On the contrary, when the chuck assembly 60 encountered a resisting force that exceeds the maintaining force which is acted on the ring gear 221, the driving force from the sun gear 211 drives the planet gears 223 to rotate the ring gear 221, thereby interrupting transmission of rotary driving power from the motor 21 to the output shaft 50. Further, the ring gear 221 has a plurality of protruding portions 224 protruded from the top side. The torque produced upon rotary motion of the motor 21 to force the planet gears 223 to rotate the ring gear 221 causes the protruding portions 224 to conquer the resisting force from the steel balls 37, thereby making the ring gear 221 to rotate. Because the resisting force applied by the steel balls 37 to the ring gear 221 comes from the spring power of the spring member 33, rotating the outer ring 34 drives the constraint member 32 to move along the second body portion 312 and to further compress or release the spring member 33. Therefore, rotating the outer ring 34 changes the spring power applied by the spring member 33 to the steel balls 37, and the resisting force produced by the steel balls 37 at the ring gear 221 is relatively adjusted. In short, when reducing the resisting force from the steel balls 37 to the ring gear 221, the chuck assembly 60 can easily be stopped by a small external resisting force; when increasing the resisting force from the steel balls 37, the chuck assembly 60 will be stopped only by a high external resisting force. On the other side, rotating the outer ring 34 achieves adjustment of the output torque of the elbow-type power hand tool 1.

Because of the structure design of the outer ring 34 and the constraint member 32, rotating the outer ring 34 does not causes the outer ring 34 to move axially, and the space limitation of the elbow shape of the housing 10 does not affect adjustment of the tensile force of the spring member 33.

As indicated above, the elbow-type power hand tool 1 is the produce of an ingenuous design. By means of the two side holes 12 of the housing 10 and the match between the outer ring 34 and the constraint member 32, the elbow-type power hand tool 1 provides a torque adjustment function.

What is claimed is:

1. An elbow-type power hand tool comprising:

a housing;

a power drive mounted inside said housing, said power drive including a motor, a planet gear set, and a transmission shaft, said transmission shaft defining an axial line;

a torque controller mounted in said housing for controlling output torque of said transmission shaft;

a battery pack mounted in said housing for providing electricity to said power drive;

an output shaft coupled to an end of said transmission shaft, said output shaft defining an axial line, which defines with the axial line of said transmission shaft a contained angle smaller than 180°; and a chuck assembly coupled to an end of said output shaft for holding a tool bit:

wherein said planet gear set comprises a ring gear having a plurality of protruded portions projecting from a top side thereof; said torque controller comprises a socket, a constraint member, a spring member, an outer ring, and a plurality of steel balls, said socket comprising a first body portion accommodating said ring gear, a second body portion for the passing of said transmission shaft, a connecting portion connected between said first body portion and said second body portion, an outer thread extended around a periphery of said second body portion, and a plurality of through holes radially extended through said connecting portion, said second body portion having an outer diameter smaller than said first body portion; wherein said constraint member comprises a coupling barrel, an inner thread formed in an inside wall of said coupling barrel and threaded onto the outer thread at said second body portion, a constraint portion extended from a top side of said coupling barrel, and a plurality of grooves longitudinally arranged on said constraint portion; wherein said steel balls are respectively mounted in the through holes of said socket and stopped at the top side of said ring gear; wherein said spring member has one end thereof pressed on said constraint portion of said constraint member and an opposite end thereof pressed on said steel balls; wherein said outer ring is sleeved onto said constraint member, having a plurality of ribs longitudinally arranged around an inside wall thereof and respectively engaged into the groves of said constraint member; wherein said housing comprises two oval side holes through which the user can rotate said outer ring with the hand.

2. The elbow-type power hand tool as claimed in claim 1, wherein said torque controller further comprises a plurality of pins respectively mounted in said through holes of said socket and stopped between said steel balls and said spring member.

3. The elbow-type power hand tool as claimed in claim 1, wherein said torque controller further comprises a washer mounted in between said steel balls and said spring member.

4. The elbow-type power hand tool as claimed in claim 1, wherein said torque further comprises a plurality of pins respectively mounted in said through holes of said socket and stopped at said steel balls, and a washer stopped at between said pins and said spring member.

5. The elbow-type power hand tool as claimed in claim 1, wherein said outer ring comprises a ring body, a ring covering directly molded on said ring body, said ring covering having a lower hardness than said ring body; said ribs are formed integral with an inside wall of said ring body.

* * * * *